United States Patent [19]
Kelley et al.

[11] Patent Number: 6,147,998
[45] Date of Patent: Nov. 14, 2000

[54] METHOD AND APPARATUS FOR PERFORMING IN-SERVICE QUALITY OF SERVICE TESTING

[75] Inventors: Paul W. Kelley, Hopkinton; Stuart P. MacEachern, Framingham; Ralph L. Beck, Sterling, all of Mass.

[73] Assignee: Visual Networks Technologies, Inc., Rockville, Md.

[21] Appl. No.: 08/992,755

[22] Filed: Dec. 17, 1997

Related U.S. Application Data

[60] Provisional application No. 60/056,955, Aug. 26, 1997.

[51] Int. Cl.[7] .................................................. H04L 12/28
[52] U.S. Cl. ......................................... 370/395; 370/397
[58] Field of Search ................................... 370/241, 244, 370/250, 251, 252, 253, 395, 232, 397

[56] References Cited

U.S. PATENT DOCUMENTS

| | | | |
|---|---|---|---|
| 4,296,495 | 10/1981 | Bursztejn | 371/22 |
| 4,406,919 | 9/1983 | Pospischil | 178/69 G |
| 4,713,810 | 12/1987 | Chum | 371/4 |
| 4,737,949 | 4/1988 | Yamamoto | 370/13.1 |
| 4,742,518 | 5/1988 | Shedd | 371/22 |
| 4,750,175 | 6/1988 | Brenneman et al. | 371/22 |
| 5,163,057 | 11/1992 | Grupp | 371/47.1 |
| 5,191,583 | 3/1993 | Pearson et al. | 370/94.1 |
| 5,343,463 | 8/1994 | Van Tetering et al. | 370/253 |
| 5,369,634 | 11/1994 | Denissen | 370/253 |
| 5,373,504 | 12/1994 | Tanaka et al. | 370/60.1 |
| 5,450,394 | 9/1995 | Gruber et al. | 370/17 |
| 5,450,440 | 9/1995 | Nishihara et al. | 375/224 |
| 5,515,363 | 5/1996 | Ben-Nun et al. | 370/17 |
| 5,519,689 | 5/1996 | Kim | 370/17 |
| 5,521,907 | 5/1996 | Ennis, Jr. et al. | 370/17 |
| 5,524,006 | 6/1996 | Hluchyj et al. | 370/84 |
| 5,533,009 | 7/1996 | Chen | 370/17 |
| 5,563,874 | 10/1996 | Kant | 370/13 |
| 5,590,116 | 12/1996 | Zhang | 370/253 |
| 5,640,401 | 6/1997 | Yamada | 371/20.5 |
| 5,737,338 | 4/1998 | Eguchi et al. | 714/716 |
| 5,764,626 | 6/1998 | VanDervort | 370/232 |

FOREIGN PATENT DOCUMENTS

| | | |
|---|---|---|
| 0 528 075 A1 | 2/1993 | European Pat. Off. |
| 3-186022 | 8/1991 | Japan |

OTHER PUBLICATIONS

Farkouh, S. "Managing ATM–Based Broadband Networks," *IEEE Communications Magazine*, vol. 31, No. 5, May 1, 1993, pp. 82–86.

Jung J–I et al. "QOS Management and Performance Monitoring in ATM Networks," *Proceedings of the Global Communications Conference (GLOBECOM)*, Houston, Nov. 29–Dec. 2, 1993, vol. 2, Nov. 29, 1993, pp. 708–712.

Kim S. "An Information Model for Performance Monitoring of Broadband Network Termination System," *Proceedings of the Region 10 Annual International Conference* (Tenco, Singapore), Aug. 22–26, 1994, vol. 1, No. Conf. 9, Aug. 22, 1994, pp. 451–455.

Patent Cooperation Treaty, International Search Report, International Application No. PCT/US 98/17496, mailed on Jan. 27, 1999, 4 pages.

*Primary Examiner*—Huy D. Vu
*Assistant Examiner*—Alexander Boakye

[57] ABSTRACT

An apparatus and method for determining the QoS of a communication system. In one embodiment a service verification equipment device (SVE) is placed into the communications link between the wide area network and the transmitting customer premise and an SVE is placed into the communications link between the wide area network and the receiving customer premise. The transmitting SVE inserts a test cell into the customer's data stream over communications link which informs the receiving SVE that a test is commencing. After a predetermined number of customer data cells are sent, the transmitting SVE inserts a termination cell into the communications link at the end of the test. The receiving SVE then compiles data related to the QoS of the communications link and that data is analyzed to determine the QoS.

19 Claims, 6 Drawing Sheets

METHOD AND APPARATUS FOR PERFORMING IN-SERVICE QUALITY OF SERVICE TESTING

RELATED APPLICATION

This application claims priority to U.S. provisional patent application Ser. No. 60/056,955, filed Aug. 26, 1997, which is incorporated herein by reference.

FIELD OF THE INVENTION

The invention relates to the field of testing digital data communications links and more specifically to the testing of the Quality of Service (QoS) of in-service digital data communications links.

BACKGROUND OF THE INVENTION

In the field of digital data network communications, data sent by a source to a destination is generally divided into unit aggregations that are switched across a network. These unit aggregations of data are referred to in the art variously by the terms cells, datagrams, frames, and packets. A Wide Area Network ("WAN") is generally an interconnection of two types of components: transmission lines (also called circuits, channels, or trunks), and switches that connect two or more transmission lines. Cells are switched from transmission line to transmission line by switches. Each switch transmits a cell via a transmission line to another switch or to its destination.

Data from different sources have different data transfer requirements, and exhibit different traffic patterns across a network. For example, computer data often exhibits an unpredictable and variable traffic pattern. Such data are often transferred from source to destination in bursts, so that there are some time periods when a relatively large volume of data is transferred across a network and other time periods when a relatively small volume of data is transferred. In contrast, real time voice and uncompressed video data usually have a constant transfer rate and usually require that data cells be delivered with appropriately small transfer delay variation. Real time compressed video transfers in bursts and is unpredictable, and also requires small transfer delay variation.

Service providers traditionally have provided circuit switched services across a Wide Area Network ("WAN") in which a dial up or leased circuit is effectively rented in its entirety by a service customer for the duration of a call. For example, a T1 circuit provides the capability of a continuous data transfer rate of 1.536M bits of information per second. Such a circuit switched T1 connection provides the entire 1.536M bits per second capability from source to destination, regardless of how many bits per second of data are actually being transmitted by the service customer. This circuit switched service effectively provides the equivalent of a direct wire through the WAN from the termination located at one service customer premise to the termination located at one other service customer premise.

Such a service customer usually contracts for this circuit switched service based on the maximum data transfer (or bandwidth) requirements of the customer by arranging for a circuit capable of providing those bandwith requirements. Often this dedication of circuit capability results in the waste of bandwidth and network resources, because the service customer does not always require the maximum data transfer rate. A circuit switched connection cannot accommodate a burst increase in data transfer rate that is above the maximum capacity of the circuit. If a service customer claims that adequate circuit switched service is not being provided, the circuit switched service provider typically runs tests to determine whether the line is operating properly.

One type of test operates on an in-service communications link meaning that the customer line remains in operation while the test is being executed and the test does not interfere with the customer use of the communications link. The test is transparent to the customer. One example of a test performed on an in-service circuit switched communications link is a test that uses management overhead information multiplexed into the T1 circuit framing. This test can verify correct operation of the circuit switched connection without interfering with the in-service communications link. Another type of test is an out of service test, for example a Bit Error Rate ("BER") test. A BER test requires the full use of the customer circuit for the test. A BER test therefore cannot operate on an in-service circuit switched communications link.

In recent years, service providers have offered a "virtual circuit" model of service. Virtual circuits can be multiplexed onto traditional T1, T3, OC3, or OC12 type circuits at the point of service customer access. Several virtual circuits may be provided on the same access line that terminate at different geographic locations, so a service customer may reach many endpoints using a single access line. Service customers contract for a specific quality of service to be provided by each virtual circuit. The service provider can take advantage of the statistically variable nature of service customers' bandwidth demands and use the bandwidth available on a line more efficiently, rather than dedicate the full bandwidth to a circuit that may not be fully used for periods of time. The service provider may be able to accommodate service customers burst traffic for short periods of time. The service customer may therefore have his communications needs met at a lower cost.

One example of a technology that provides virtual circuits is Asynchronous Transfer Mode ("ATM"). ATM networks have lines and switches like traditional networks, but the switches operate differently. In ATM, all information is transmitted in small fixed-size cells. ATM cells are 53 bytes long; the first five bytes contain header information and the other 48 bytes contain message payload. The cells are switched individually across the network. Because the cells are relatively small they can be switched at very high speeds. Such cell switching can handle both constant rate traffic (audio, video) and variable rate traffic (data). Cell switching can also provide the ability to broadcast. Although ATM networks switch each cell individually, ATM is connection-oriented. Data transfer requires that first a message be sent to set up the connection. Subsequent cells all follow the same path to the destination. This connection is a virtual circuit.

Asynchronous transfer mode virtual circuits are typically purchased with a specified set of quality of service ("QoS") parameters. The ATM standards, for example International Telecommunications Union standard ITU-T I.356, define a number of these QoS parameters. For each parameter, a worst case value is specified, and the service provider is required to meet or exceed the worst case value. In some cases the parameter is a minimum and in others it is a maximum. The Peak Cell Rate ("PCR") is the maximum rate at which the sender is allowed to send cells. The Sustained Cell Rate ("SCR") is the expected or required cell transfer rate averaged over a longer time interval. The Cell Delay Variation ("CDV") specifies how much variation will be present in cell arrival times relative to cell transmission times, in other words, how uniformly the cells are delivered.

The Cell Transfer Delay ("CTD") is the average transit time from source to destination. The Cell Error Ratio ("CER") is the fraction of cells that are delivered on time but with one or more wrong bits. The Cell Loss Ratio ("CLR") is the fraction of transmitted cells that are not delivered within a maximum allowable cell transfer delay. The Severely-Errored Cell Block Ratio ("SECBR") is the number of blocks of a given length that contain n cells with one or more wrong bits, where n is typically much greater than one. The Cell Misinsertion Rate ("CMR") is the number of cells/second that are delivered to the virtual circuit destination but were not sent by the source but rather were inadvertently created by the network.

Another example of a technology that provides virtual circuits is Frame Relay. Frame relay provides a very simple protocol for sending data from one point to another. The service customer can send cells of up to approximately 1600 bytes between two virtually connected points. Like ATM, contracting between the service provider and the service customer determines QoS requirements. Measurement of the QoS parameters described above is therefore also useful for frame relay.

Virtual circuit services present a new problem to the service provider. A service provider must be able to test the QoS of a virtual circuit to verify that the virtual circuit meets the contracted parameters. International Telecommunications Union (ITU) standards describe methods to test QoS by sending test streams of cells over the customer virtual circuit. Such tests require that the service customer virtual circuit be turned off, and are therefore an out of service test. The inability to use the customer virtual circuit may be irritating to the service customer. Other tests run simultaneously through the network along with the service customer's virtual circuit, but are separately identified on a test virtual circuit which uses the same path and equal bandwidth. This approach risks stressing the customer virtual circuit such that the test may induce a QoS problem where none actually existed when the test was not running.

U.S. Pat. No. 5,369,634 to Denissen discloses a quality assessment arrangement useful for cells having a header that "contains information identifying the communication to which the cell belongs and a tag" (col. 3 lines 14–16). The Denissen apparatus counts the customer data cells and injects test packets into the customer's cell stream every M cells. "[C]ounter 3 provides the cell count M+1 to the generator 4 and as a consequence the latter then generates a test cell . . . " (col. 3 lines 43–45). The test cell header has "an identification tag indicative of a test cell." The test cell header is therefore different than the customer data cell headers. Denissen has the disadvantage of not being useful for technologies in which a cell header does not have tag information. Without the distinguishing tag information in the header, the Denissen arrangement cannot distinguish between test packets and customer service packets. Also, Denissen sends test packets every M cells, which risks stressing the virtual circuit such that the test may induce a QoS problem where none actually existed when the test was not running.

What is desired is virtual circuit QoS measurement for an in-service virtual circuit in a manner that is accurate and transparent to the user. The present invention permits such measurement.

SUMMARY OF THE INVENTION

The invention relates to an apparatus and method for determining the QoS of a communication system. In one embodiment a service verification equipment ("SVE") device is placed into the communications link between a wide area network and a transmitting service customer premise and an SVE is placed into the communications link between the wide area network and a receiving service customer premise. The transmitting SVE inserts a test cell having the customer's address header but having a special data payload into the service customer data stream flowing over the communications link. This special payload informs the receiving SVE that a test is commencing. After a predetermined number of service customer data cells are sent, the transmitting SVE inserts a termination cell into the communications link to end the test. The receiving SVE then compiles data related to the QoS of the communications link and analyzes that data to determine the QoS.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

Like reference characters in the respective drawn figures indicate corresponding parts.

DESCRIPTION OF INVENTION

Figure 1:
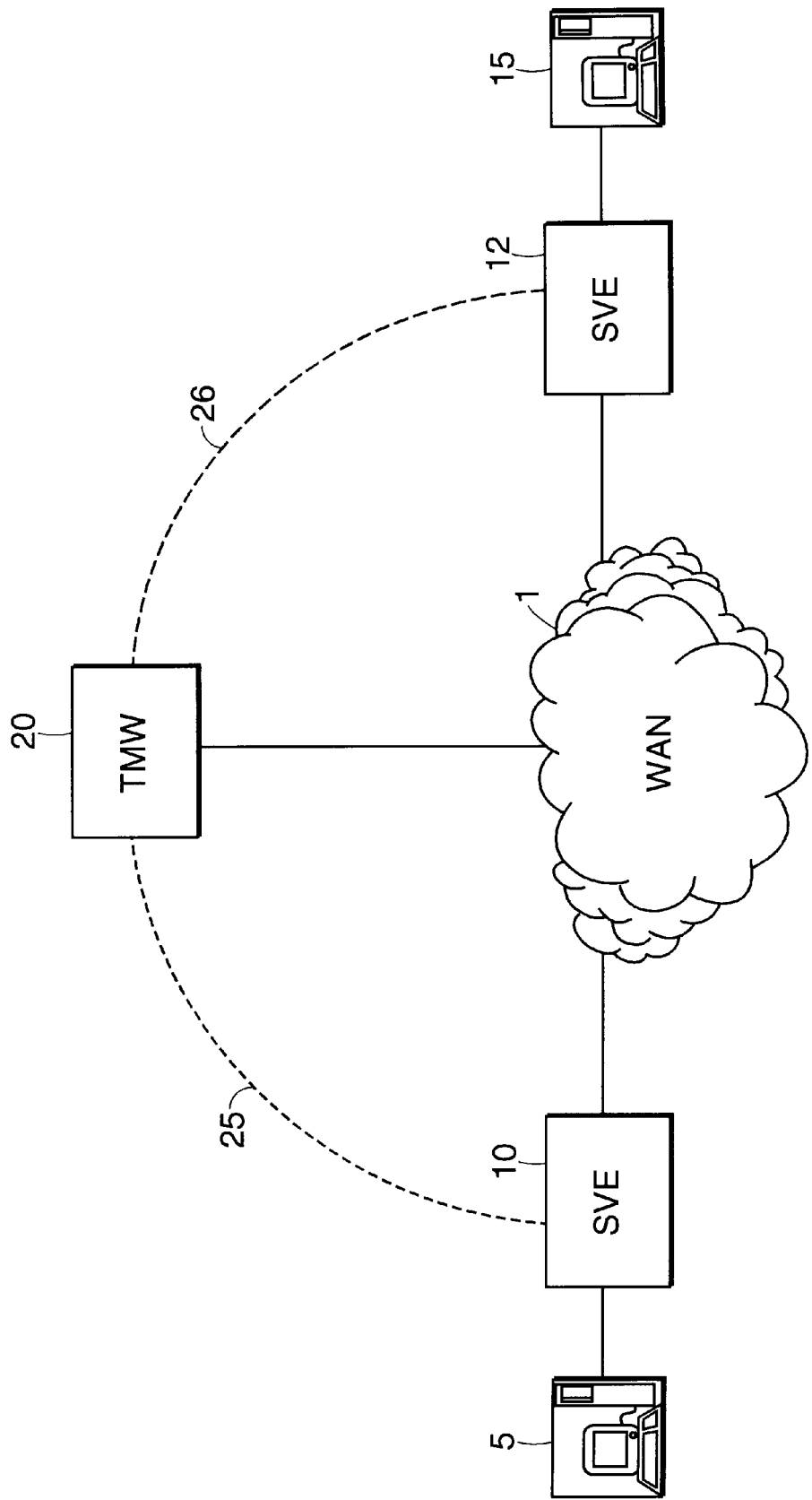
FIG. 1 is a block diagram of an embodiment of a QoS system utilizing the invention.

An embodiment of the invention providing an in-service virtual circuit QoS test that adds negligible additional traffic to the network and is transparent to the service customer is shown in FIG. 1. The WAN 1 shown can be any type of WAN that supports virtual circuits, including for example, but not limited to, ATM or Frame Relay. The embodiments of the invention described below use the term "cell" meaning a unit aggregation of data routed between an origin and a destination across a network, and at least refers to, but is not limited to, a cell, datagram, frame, or packet associated with any technology that supports virtual circuits.

Service Verification Equipment ("SVE") 10, 12 is inserted provisionally or permanently at the termination points of the virtual circuit on the service customer premises or at the service provider's point of presence ("POP") between the service customer 5, 15 and the network 1. In one embodiment, test management workstation ("TMW") 20 communicates with each SVE 10, 12 using management virtual circuits established for this purpose. In another embodiment, TMW 20 communicates with each SVE 10, 12 by an alternate or "out of band" communications link 25, 26.

In one embodiment, TMW 20 is used by the service provider to initiate QoS tests. TMW 20 sends a message to each SVE 10, 12 to initiate testing after a delay sufficient to insure that the SVEs 10,12 are prepared for the test. Additional parameters are specified by TMW 20, including any of the QoS parameters to be measured, the content of a test initiation cell, the content of a test termination cell, and the length of the test (which may be specified in units of cells or time). In another embodiment, one of the SVEs 10, 12 initiates testing and specifies the test parameters.

Tests may be full or half duplex so that one SVE 10, 12 may test outbound traffic, inbound traffic, or both simultaneously. In the following description an embodiment of a half duplex test is described. In this embodiment transmitting SVE 10 sends data to receiving SVE 12. In another embodiment, the roles of SVE 10, 12 are reversed. In yet another embodiment, each SVE 10, 12 simultaneously transmits and receives full duplex data.

Transmitting SVE 10 first inserts a test initiation cell into the virtual circuit under test. With respect to the virtual circuit identification information in the header, the test initiation cell is indistinguishable from other cells passing across the virtual circuit. The test initiation cell will therefore be transmitted through the network in the same manner as all other cells on the virtual circuit. The bytes of payload data contained in the test initiation cell are a Unique Cell Identifier ("UCI"). The UCI is unique in the sense that for all practical purposes, the probability of the service customer transmitting an identical cell is close to zero.

In one embodiment using an ATM cell, the UCI is a random pattern of data such that the probability of a cell of service customer data having the same pattern is equal to approximately $\frac{1}{2}^{384}$. This probability is determined by the fact that there are 48 bytes in an ATM cell payload, each byte having 8 bits for a total of 384 bits. In one embodiment, prior to being used as a test cell identifier, the random pattern is examined to determine if it might be a pattern that frequently appears in data, such as, but not limited to, a repeating pattern or all 1's or 0's. In this embodiment, if examination reveals that the pattern might appear frequently in the data, a different pattern is chosen. Such examination can be manual or automatic and may be done once, if the random pattern is selected once, or each time if a new random pattern is selected for each test. In one embodiment, the random pattern is made known to transmitting SVE 10 and receiving SVE 12 via communication from TMW 20. In another embodiment, the random pattern is made known to transmitting SVE 10 and receiving SVE 12 by a predetermined hardware setting such as DIP switches or storage in ROM.

Transmitting SVE 10 measures and stores QoS data beginning with the first cell transmitted after the transmission of the test initiation cell. In one embodiment, the data may include any or all of the cell header, the cell payload, the current time, the elapsed time between each cell, and the number of cells. In one embodiment, a copy of all cells transmitted are stored. In another embodiment, transmitting SVE 10 computes a checksum for each cell payload, and stores the checksum instead of the cell payload data. This has the advantage of reducing the amount of test data stored and transmitted, and also ensures service customer data privacy. In another embodiment, all cells transmitted are stored with a time stamp. In another embodiment, the data required to store the time stamp is compressed by calculating the elapsed time from the last cell reception. In another embodiment, a crc32 payload data checksum is stored along with a elapsed timestamp thereby representing the time and data associated with a 53 byte ATM cell in 6 bytes.

Transmitting SVE 10 terminates the test by inserting a test termination cell into the virtual circuit cell stream. In one embodiment, this test termination cell is identical to the test initiation cell.

Receiving SVE 12 observes the arriving cells on the virtual circuit under test. It submits each cell to a UCI subsystem that determines if the cell is the test initiation cell containing the UCI. When it observes the test initiation cell, receiving SVE 12 begins measuring and storing QoS data beginning with the first cell received after the initiation cell. Receiving SVE 12 removes the test initiation cell from the data stream, so that the actual data stream of the service customer is not affected by the testing. For each test, receiving SVE 12 stores data parameters for the data it receives that correspond to data parameters transmitting SVE 10 stores for the data it sends.

When receiving SVE 12 receives the test termination cell, the test terminates and receiving SVE 12 removes the test termination cell from the data stream, so that the service customer data stream is not affected by the testing.

In one embodiment, once the data required to determine QoS is collected, processing occurs at TMW 20. In another embodiment processing may occur at transmitting SVE 10, receiving SVE 12, TMW 20, or other processing site to which the data collected is forwarded. In one embodiment, data to evaluate QoS parameters such as CMR, CER, SECBR, and CLR are sent to a central collection point so that the cells may be compared on a cell by cell basis. In another embodiment, tests such as CDV tests receive confirmation from the transmitting SVE 10 and receiving SVE 12 that the delay between cells did not exceed a QoS value at either end.

In one embodiment, the service customer data consists of packets such as those specified by the ATM AAL5 specification that have Cyclic Redundancy Checking ("CRC") or other such error detection mechanisms. In this embodiment transmitting SVE 10 and receiving SVE 12 may determine whether packet contents were transmitted accurately by calculating the CRC value on the data and comparing the calculated CRC with the received CRC. The test runs independently of the service customer and terminates randomly with respect to multiple cells in the service customer data stream, so the first and last AAL5 packets may be incomplete and no CRC calculation can be made for that packet.

Figure 2:
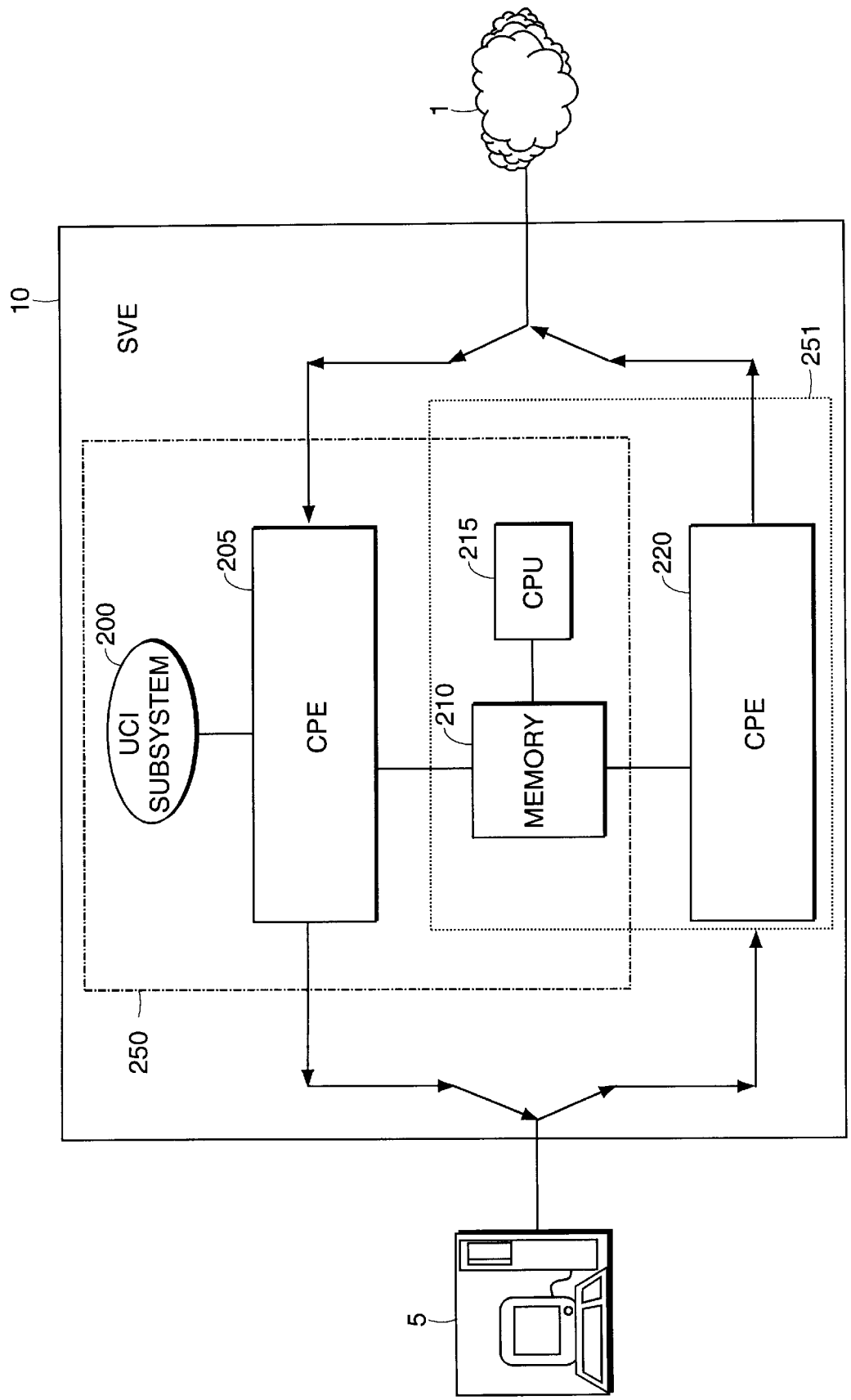
FIG. 2 is a block diagram of an embodiment of the service verification equipment of the invention as shown in FIG. 1.

FIG. 2 shows a block diagram of one embodiment of SVE 10. In this embodiment, SVE 10 is described as two interconnected subsystems: receiving subsystem 250 and transmitting subsystem 251. In this embodiment, the subsystems share memory 210 and CPU 215. In an alternate embodiment, receiving subsystem 250 and transmitting subsystem 251 each have its own memory 210. In an alternate embodiment, receiving subsystem 250 and transmitting subsystem 251 each have its own memory 210 and CPU 215.

In the embodiment of FIG. 2, cells arriving from WAN 1 are received by receiving subsystem 250. Cells received from WAN 1 first go to Cell Processing Engine ("CPE") 205. Before a test begins, CPE 205 inspects the cell header to determine if the cell is associated with the virtual circuit under test and UCI subsystem 200 checks each cell to determine if it is a test initiation cell. If a cell is not associated with the virtual circuit under test or if a cell does not contain the UCI, CPE 205 passes the cell on to service customer 5. If the cell is associated with the virtual circuit under test and UCI subsystem 200 recognizes a test initiation cell, then a test commences, and CPE 205 does not pass the test initiation cell on to the service customer. Once the test begins, CPE 205 inspects the cell header to determine if the cell is associated with the virtual circuit under test and UCI subsystem 200 checks each cell to determine if it is a test termination cell. If the cell is associated with the virtual circuit under test, then data about the cell, and optionally the cell data itself, is copied into memory 210. The data can then be operated on by CPU 215.

When UCI subsystem 200 recognizes a test termination cell, the test terminates. Again, the test termination cell is not passed on to the service customer. In one embodiment, CPU 215 compiles statistics and test results based on data in memory 210. In another embodiment, CPU 215 transmits all collected data to TMW 20. In another embodiment, CPU 215 compiles statistics and test results based on data in memory 210 prior to transmitting the collected statistics and test results to the TMW 20.

Cells going from service customer 5 go through transmitting subsystem 251 and CPE 220. Before a test commences, cells from service customer 5 are passed through CPE 220 to WAN 1. When a test commences, CPE 220 creates a test initiation cell and passes the test initiation cell to WAN 1. CPE 220 then begins collecting QoS data on all cells flowing from service customer 5 to WAN 1. QoS data is stored in memory 210. When a test ends, CPE 220 creates a test termination cell. The test termination cell is passed by CPE 220 to WAN 1. Data collection is then terminated.

Figure 3:
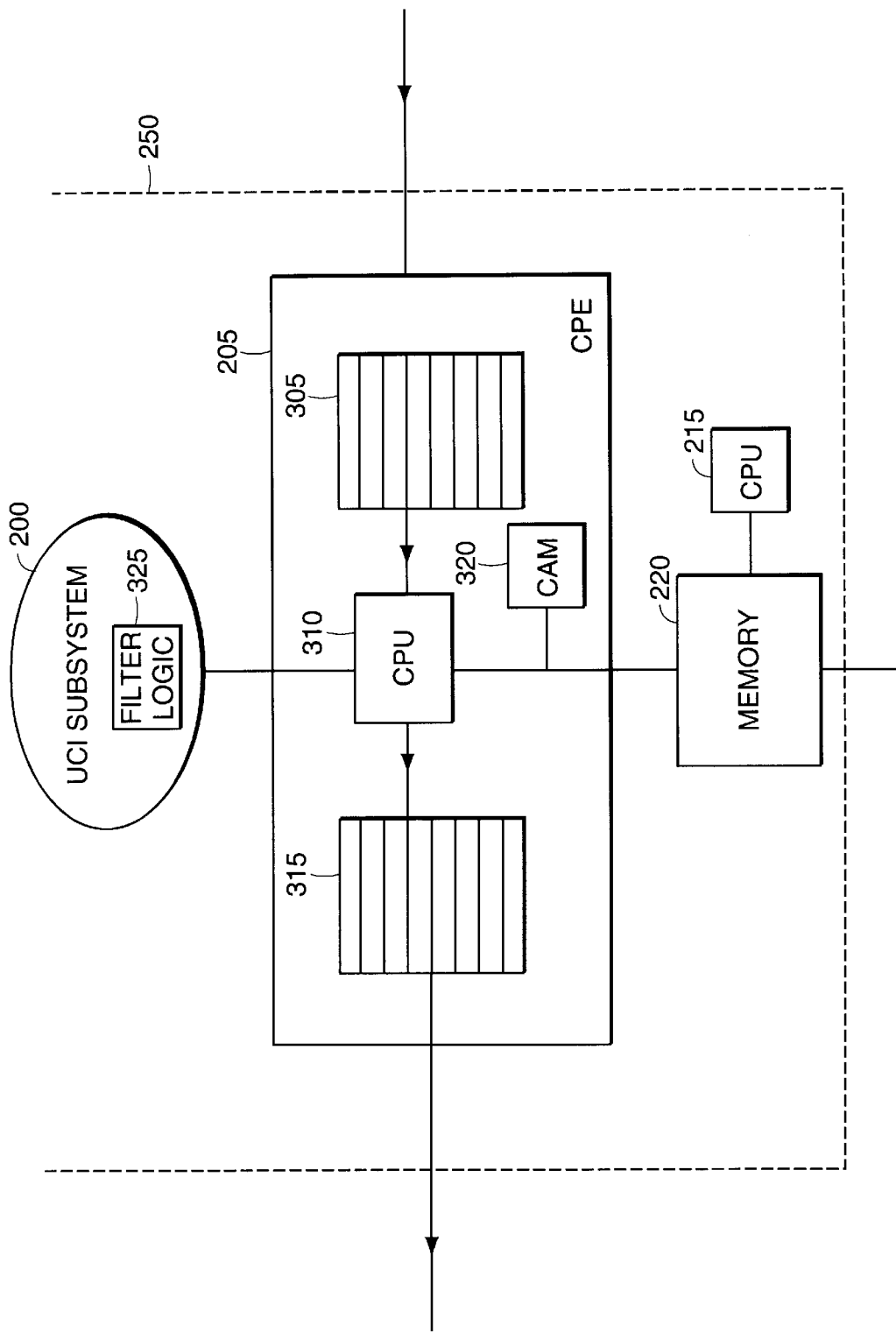
FIG. 3 is an embodiment of the receiving subsystem of the service verification equipment of the invention.

FIG. 3 shows a more detailed block diagram of receiving subsystem 250. Arriving cells are queued in Cell Buffer Ram ("CBRAM") 305, which in one embodiment is a FIFO memory of the type well known in the art. Each cell is processed by CPU 310 in FIFO order. Filter logic 325 in UCI Subsystem 200 compares cell data with the UCI. If the cell is not the UCI, CPU 310 queues the cell on CBRAM 315.

If a cell is associated with the virtual circuit under test and is recognized as the UCI, that cell is not queued on to CBRAM 315, and the test commences. Every cell thereafter is checked by Filter Logic 325 in the UCI subsystem 200 to determine if it is a test termination cell. If a cell is not a test termination cell, then the header is checked to see if it is associated with the virtual circuit under test through the use of Content Addressable Memory ("CAM") 320 of the type commercially available from MUSIC Semiconductors, Inc. of Hackettstown, N.J. A CAM is useful for this comparison because it can compare the cell header against an entire list of pre-stored entries simultaneously, thereby reducing the search time. If the cell is not associated with the virtual circuit under test, then it is queued on CBRAM 315. If the cell is associated with the virtual circuit under test then CPU 310 writes the required data to memory 220 and queues the cell on CBRAM 315. When Filter Logic 325 recognizes a test termination cell, that cell is not passed on, and data logging terminates.

Figure 4:
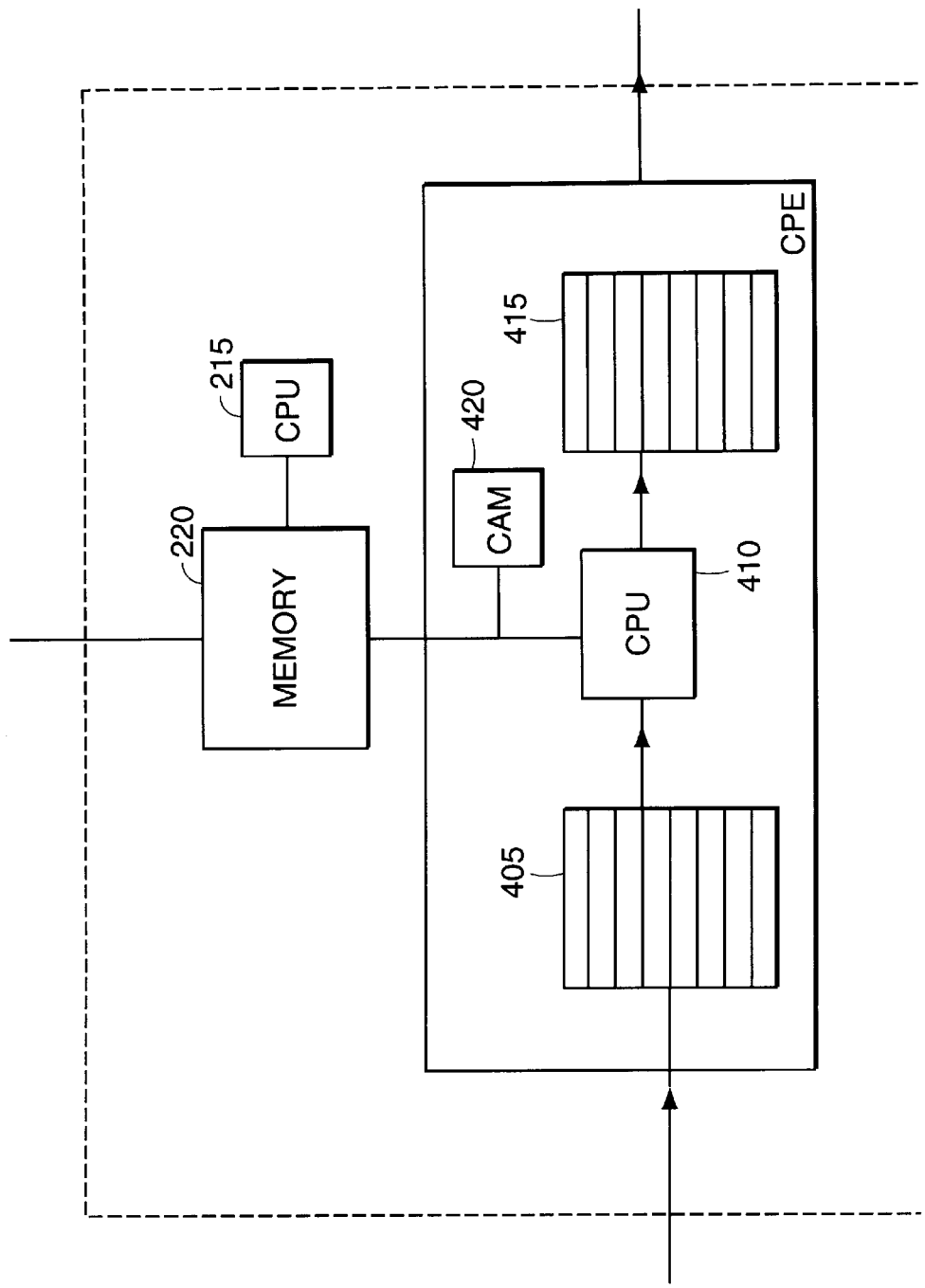
FIG. 4 is an embodiment of the transmitting subsystem of the service verification equipment of the invention.

FIG. 4 shows a block diagram of an embodiment of transmitting subsystem 251. Before a test commences, cells transmitted from the service customer are queued in CBRAM 405, and are queued on CBRAM 415 by CPU 410. Cells pass from CBRAM 415 out to WAN 1. To begin a test, CPU 410 queues a test initiation cell on CBRAM 415. Header data from each cell from the service customer that is queued on CBRAM 405 is then compared to the identifier for the virtual circuit under test using CAM 420. If a cell is not associated with the virtual circuit under test, then it is queued on CBRAM 415. In this way, data is not gathered for customer cells associated with a different virtual circuit. If a cell is associated with the virtual circuit under test, then data associated with the cell is stored in memory 220, and the cell is queued on CBRAM 415. When the test is finished CPU 410 inserts a test completion cell into the cell stream by queuing the test completion cell on CBRAM 415.

Figure 5:
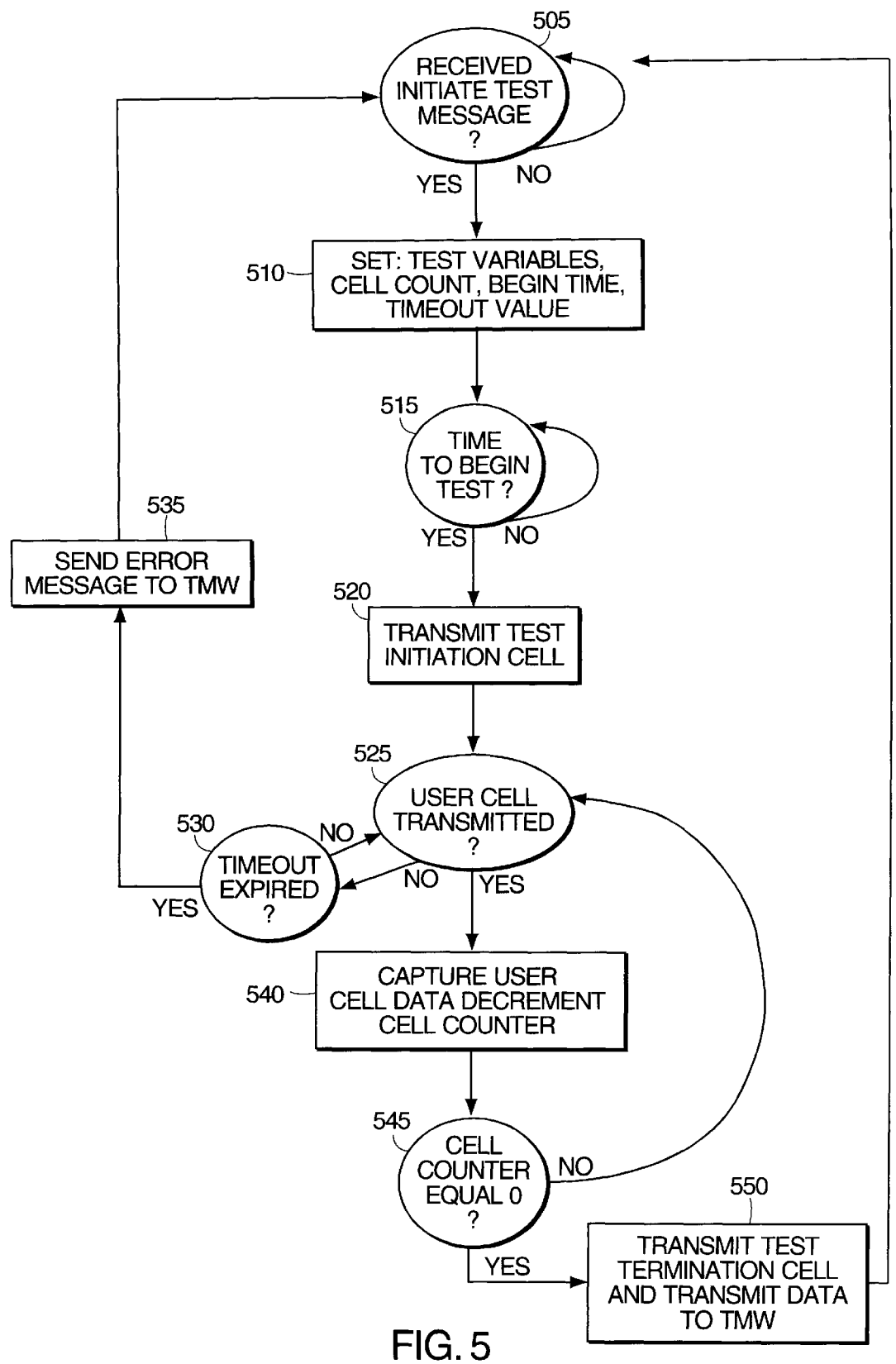
FIG. 5 is a flowchart describing the actions of the transmitting subsystem of the service verification equipment of the invention.

Referring to FIG. 5, a flowchart describing the actions of the transmitting subsystem of the service verification equipment of the invention is shown. The transmitting SVE waits for an initiate test message from the TMW 505. When transmitting SVE receives the test message, it initializes test variables based on the initiate test message received from the TMW 510. The variables include the cell count, the test time to begin and a timeout value for the test. Transmitting SVE then waits the appropriate amount of time for the test to begin 515. When it is time for the test, the transmitting SVE transmits a test initiation cell 520. Transmitting SVE then waits for the customer to transmit a user cell 525. If no user cell has been transmitted within the timeout period 530, then an error message will be sent to the TMW 535. If a user cell is transmitted, then the user cell data will be captured and the cell counter will be decremented 540. If the cell counter is not zero 545, then the transmitting SVE waits 525 for the next user cell. The system will loop in this manner until the cell counter has decremented to zero. Once the cell counter decrements to zero, as transmitting SVE will transmit a test termination cell and transmit the test results to the TMW 500.

Figure 6:
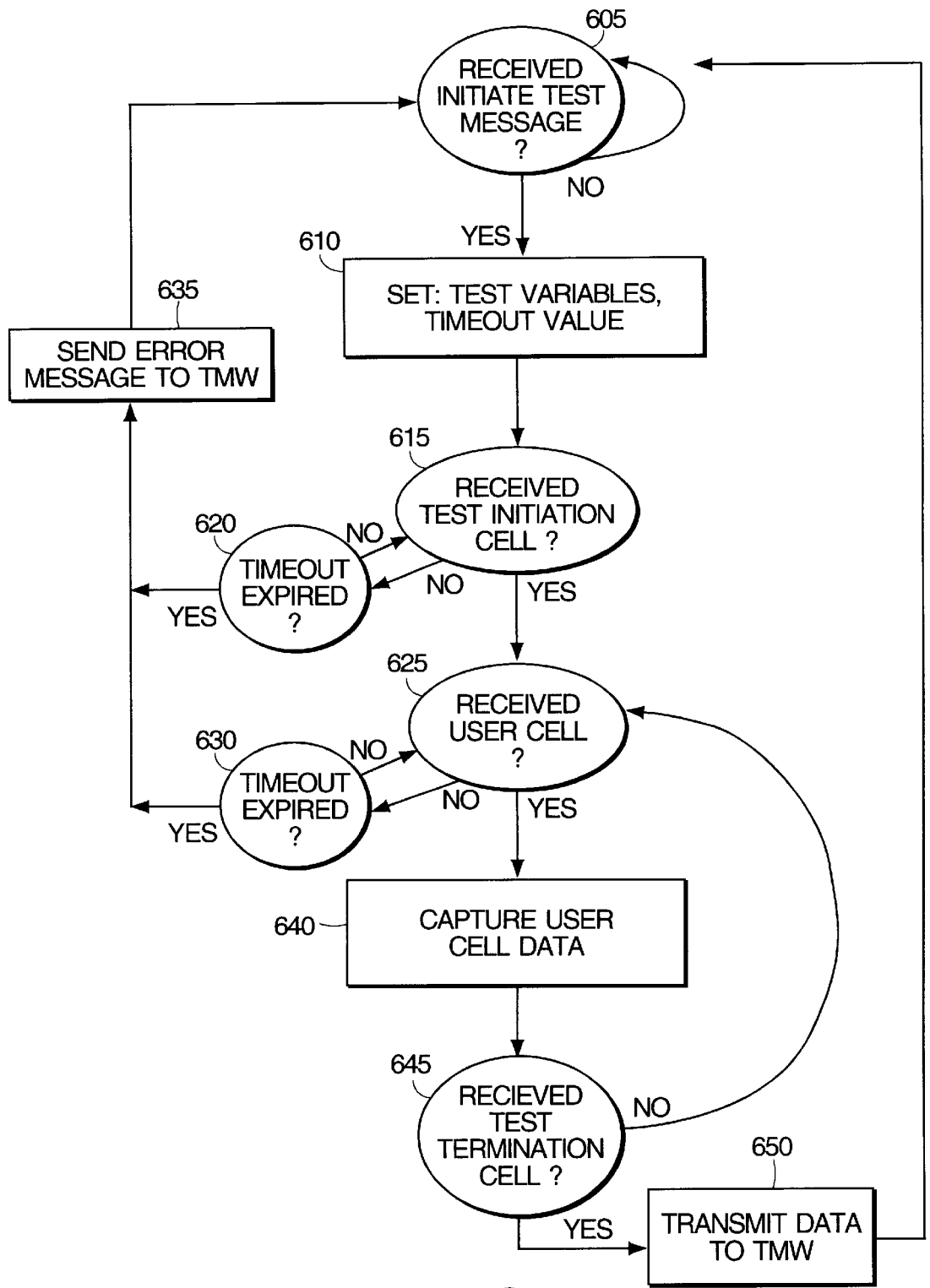
FIG. 6 is a flowchart describing the actions of the receiving subsystem of the service verification equipment of the invention.

FIG. 6 is a flowchart describing the actions of the receiving subsystem of the service verification equipment of the invention. The receiving SVE waits until it has received the initiate test message from the TMW 605. Once it receives the test message receiving SVE sets test variables based on the information in the initiate test message and sets a timeout value for the test 610. Receiving SVE then waits for the test initiation cell 615. The receiving SVE waits until the test initiation cell is captured or until a timeout occurs 620. Once the test initiation cell has been received, then the receiving SVE waits for a user cell to be received 625. If no user cell is received before timeout 630, then an error message will be sent to the TMW 635. If a user cell is received 625, then the appropriate user cell data will be collected 640. If the cell is determined not to be the test termination cell, then receiving SVE waits for the next cell 625. If a test termination cell is received 645, the receiving SVE will transmit the test results to the TMW 650.

Having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the following claims.

What is claimed is:

1. A method of testing QoS in an in-service communications link comprising the steps of:

inserting, by a transmitting service verification equipment device located at a transmitting customer premise, a test initiation cell having a standard header and a specific payload into a data stream from said transmitting customer premise;

receiving, by a receiving service verification equipment device located at a receiving customer premise, the data stream;

determining by the receiving service verification equipment that a cell in the data stream is the test initiation cell by reading the specific payload of the cell, said cell payload indicating that a test is being initiated;

continuing to transmit by the transmitting service verification equipment device a number of cells of the customer's data stream;

receiving by said receiving service verification equipment device said number of cells of customer's data stream;

collecting by said receiving service verification equipment device statistical data regarding the QoS of the communications link;

inserting, by said transmitting service verification equipment device located at a transmitting customer premise, a test termination cell having a standard header and a specific payload into a data stream of said customer indicating to said receiving service verification equipment device located at said receiving customer premise that said test is being terminated; and analyzing said data collected by said receiving service verification equipment device to determine QoS.

2. The method of claim 1 further comprising the step of determining, by said receiving service verification device, that a cell is a test termination cell by reading the payload of the cell.

3. The method of claim 1 wherein the statistical data collected is a checksum of each of the number of cells of the customer's data stream.

4. The method of claim 1 wherein the statistical data collected is a timestamp of each of the number of cells of the customer's data stream.

5. The method of claim 4 wherein the timestamp is compressed by calculating elapsed time.

6. The method of claim 1 further comprising the step of transmitting the statistical data collected to a test management workstation.

7. A system for testing an in-service communications link between a first service customer located at a first service customer premise and a second service customer located at a second service customer premise, comprising:

a first service verification equipment device inserted between the first service customer and the in-service communications link passing data cells from the first service customer to the in-service communications link and passing to the in-service communications link a test initiation cell having a header identical to the data cells of the first service customer and having an unique payload;

a second service verification equipment device inserted between the in-service communications link and the second service customer passing data cells from the in-service communications link to the second service customer and recognizing the unique payload in the test initiation cell and not passing the test initiation cell on to the second service customer.

8. The system of claim 7 in which the first service verification equipment device passes a test termination cell having a header identical to the data cells of the first service customer and having a unique payload and in which the second service verification equipment device recognizes the unique payload in the test termination cell and does not pass the test initiation cell on to the second service customer.

9. The system of claim 8 in which the first service verification equipment device begins logging quality of service data after passing the test initiation cell and in which the second service verification equipment device begins logging quality of service data after receiving the test initiation cell.

10. The system of claim 9 in which the first service verification equipment device terminates logging quality of service data after passing the test termination cell and in which the second service verification equipment device terminates logging quality of service data after receiving the test termination cell.

11. The system of claim 10 in which the data logged is a checksum of the payload of each data cell.

12. The system of claim 10 in which the data logged is a timestamp.

13. The system of claim 12 in which the timestamp is compressed by calculating elapsed time from the passing of an immediately previous data cell.

14. The system of claim 10 in which the first service verification equipment device transmits logged data to a test management workstation and the second service verification equipment device transmits logged data to the test management workstation.

15. A system for testing an in-service communications link between a first service customer located at a first service customer premise and a second service customer located at a second service customer premise, comprising:

a first service verification equipment device inserted between the first service customer and the in-service communications link passing data cells from the first service customer to the in-service communications link and passing to the in-service communications link a test termination cell having a header identical to the data cells of the first service customer and having an unique payload;

a second service verification equipment device inserted between the in-service communications link and the second service customer passing data cells from the in-service communications link to the second service customer and recognizing the unique payload in the test termination cell and not passing the test initiation cell on to the second service customer.

16. A method of testing QoS in an in-service communications link comprising the steps of:

inserting, by a transmitting service verification equipment device located at a transmitting customer premise, a test initiation cell having a standard header and a specific payload into a data stream from said transmitting customer premise indicating to a receiving service verification equipment device located at a receiving customer premise that a test is being initiated;

continuing to transmit by the transmitting service verification equipment device a number of cells of the customer's data stream;

receiving by said receiving service verification equipment device said number of cells of customer's data stream;

collecting by said receiving service verification equipment device statistical data regarding the QoS of the communications link, said statistical data comprising a checksum of each of the number of cells of the customer's data stream;

inserting, by said transmitting service verification equipment device located at a transmitting customer premise, a test termination cell having a standard header and a specific payload into a data stream of said customer indicating to said receiving service verification equipment device located at said receiving customer premise that said test is being terminated; and analyzing said data collected by said receiving service verification equipment device to determine QoS.

17. The method of claim 16 further comprising the step of determining, by the receiving service verification device, that a cell is a test initiation cell by reading the payload of the cell.

18. The method of claim 16 further comprising the step of determining, by the receiving service verification device, that a cell is a test termination cell by reading the payload of the cell.

19. The method of claim 16 further comprising the step of transmitting the statistical data collected to a test management workstation.

* * * * *

UNITED STATES PATENT AND TRADEMARK OFFICE
CERTIFICATE OF CORRECTION

PATENT NO. : 6,147,998
DATED : November 14, 2000
INVENTOR(S) : Paul W. Kelley, Stuart P. MacEachern and Ralph L. Beck It is certified that error appears in the above-identified patent and that said Letters Patent is hereby corrected as shown below:

Column 10,
Line 9, cancel the text beginning with "15. A system for testing" to and ending "second service customer.", and insert the following claim:

15. A system for testing an in-service communications link between a first service customer located at a first service customer premise and a second service customer located at a second service customer premise, comprising:

a first service verification equipment device inserted between the first service customer and the in-service communications link passing data cells from the first service customer to the in-service communications link and passing to the in-service communications link a test termination cell having a header identical to the data cells of the first service customer and having an unique payload;

a second service verification equipment device inserted between the in-service communications link and the second service customer passing data cells from the in-service communications link to the second service customer and recognizing the unique payload in the test termination cell and not passing the test termination cell on to the second service customer.

Signed and Sealed this

Fifth Day of April, 2005

JON W. DUDAS
*Director of the United States Patent and Trademark Office*